United States Patent
Coste et al.

(10) Patent No.: US 9,857,485 B2
(45) Date of Patent: Jan. 2, 2018

(54) METHODS AND SYSTEMS FOR MARINE SURVEY ACQUISITION

(71) Applicant: WESTERNGECO L.L.C., Houston, TX (US)

(72) Inventors: Emmanuel Coste, Houston, TX (US); Nicolas Goujon, Oslo (NO); Robert Montgomery Laws, Cliftonville (GB)

(73) Assignee: WESTERNGECO L.L.C., Houston, TX (US)

( * ) Notice: Subject to any disclaimer, the term of this patent is extended or adjusted under 35 U.S.C. 154(b) by 678 days.

(21) Appl. No.: 14/207,771

(22) Filed: Mar. 13, 2014

(65) Prior Publication Data

US 2014/0269173 A1   Sep. 18, 2014

Related U.S. Application Data

(60) Provisional application No. 61/787,785, filed on Mar. 15, 2013.

(51) Int. Cl.
  *G01V 1/38* (2006.01)
  *G01V 1/00* (2006.01)
  *G01V 1/20* (2006.01)

(52) U.S. Cl.
  CPC .............. *G01V 1/006* (2013.01); *G01V 1/201* (2013.01); *G01V 1/3808* (2013.01); *G01V 1/3843* (2013.01); *G01V 1/3861* (2013.01)

(58) Field of Classification Search
  CPC .............................. G01V 1/3861; G01V 1/38
  USPC ................... 181/110, 111, 118, 120; 367/15
  See application file for complete search history.

(56) References Cited

U.S. PATENT DOCUMENTS

| | | | | |
|---|---|---|---|---|
| 3,831,136 A * | 8/1974 | Sagoci | ..................... | G01V 1/20 367/19 |
| 4,727,956 A | 3/1988 | Huizer | | |
| 4,914,636 A * | 4/1990 | Garrotta | ................. | G01V 1/003 181/111 |
| 5,973,995 A * | 10/1999 | Walker | ................. | G01V 1/3808 367/20 |
| 6,088,296 A | 7/2000 | Seaman et al. | | |
| 6,088,297 A | 7/2000 | Stottlemyer | | |
| 6,683,819 B1 | 1/2004 | Estaphan et al. | | |
| 7,257,049 B1 * | 8/2007 | Laws | ..................... | G01V 1/006 181/113 |
| 8,619,497 B1 * | 12/2013 | Sallas | ...................... | G01V 1/38 367/23 |

(Continued)

FOREIGN PATENT DOCUMENTS

WO     2012123883     9/2012

OTHER PUBLICATIONS

Kragh et al., "Z014: Reducing the Size of the Seismic Source with a 4C Towed-marine Streamer," 74th EAGE Conference & Exhibition, Jun. 2012: pp. 1-5.

(Continued)

*Primary Examiner* — Ian J Lobo (57) ABSTRACT

A marine survey acquisition system. The system may include a vessel for towing a marine survey spread. The marine survey spread may include streamers, marine vibrators and a cable. The cable may be coupled to a respective streamer from among the streamers and one of the marine vibrators. The cable may power the respective streamer and the one of the marine vibrators. The one of the marine vibrators may emit energy at a high frequency range.

19 Claims, 6 Drawing Sheets

(56) References Cited

U.S. PATENT DOCUMENTS

| | | | |
|---|---|---|---|
| 8,724,428 B1* | 5/2014 | Sallas | 367/38 |
| 2002/0064089 A1* | 5/2002 | Ambs | G01V 1/006 367/23 |
| 2003/0210609 A1 | 11/2003 | Jeffryes | |
| 2004/0125701 A1 | 7/2004 | Raillon et al. | |
| 2006/0164916 A1* | 7/2006 | Krohn | G01V 1/005 367/41 |
| 2010/0254215 A1* | 10/2010 | Cambois | G01V 1/38 367/20 |
| 2011/0211422 A1 | 9/2011 | Moldoveanu | |
| 2012/0081994 A1 | 4/2012 | Husom et al. | |
| 2012/0155217 A1* | 6/2012 | Dellinger | G01V 1/005 367/38 |
| 2012/0300582 A1* | 11/2012 | Winter | G01S 3/8022 367/19 |
| 2012/0314536 A1* | 12/2012 | Bagaini | G01V 1/3808 367/20 |
| 2013/0333974 A1 | 12/2013 | Coste et al. | |
| 2014/0226439 A1* | 8/2014 | Tenghamn | B06B 1/0276 367/15 |
| 2014/0278116 A1 | 9/2014 | Halliday et al. | |

OTHER PUBLICATIONS

Laws et al., "B026: Are Seismic Sources Too Loud?" 70th EAGE Conference & Exhibition, Jun. 2008: pp. 1-5.
International Search Report and Written Opinion of PCT Application No. PCT/US2014/026978 dated Jun. 26, 2014: pp. 1-16.
International Preliminary Report on Patentability issued in the related PCT application PCT/US2014/026978, dated Sep. 15, 2015 (11 pages).
The Partial Supplementary European Search Report issued in the related EP Application 14768647.1, dated Sep. 16, 2016 (7 pages).
European Search Report issued in the related EP Application 14768647.1, dated Dec. 12, 2016 (5 pages).

* cited by examiner

METHODS AND SYSTEMS FOR MARINE SURVEY ACQUISITION

CROSS-REFERENCE TO RELATED APPLICATION

This application claims the benefit of U.S. Provisional Patent Application Ser. No. 61/787,785 filed Mar. 15, 2013, which is incorporated herein by reference in its entirety.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones located in seismic units) laid out in a seismic spread covering a region of the earth's surface. The recorded signals may then be processed to yield a seismic survey.

In a spread for a seismic survey, a plurality of sources and receivers may be arranged in a grid, such that the recorded data from the wavefields may substantially cover the entire area of exploration and with sufficient resolution to detect the variation of the sub-surface structure over small spatial distances. The wavefields recorded by the receivers may be a result of the superposition of many waves having different paths through the earth's sub-surface before finally reaching the receivers. This may make the reconstruction of the earth sub-surface difficult. One objective of seismic data processing is to separate the wavefields into coherent waves in connection with creating an accurate image of the earth's sub-surface layers. Because seismic data acquisition is quite expensive, it is desirable to increase the distance between the grid points and still provide sufficient resolution or use the same or tighter grid and achieve finer resolution.

SUMMARY

Described herein are implementations of various technologies for a marine survey acquisition system. The system may include a vessel for towing a marine survey spread. The marine survey spread may include streamers, marine vibrators and a cable. The cable may be coupled to a respective streamer from among the streamers and one of the marine vibrators. The cable may power the respective streamer and the one of the marine vibrators. The one of the marine vibrators may emit energy at a high frequency range.

Described herein are implementations of various technologies for a marine survey acquisition system. The system may include a vessel for towing a marine survey spread. The marine survey spread may include a streamer with a receiver, a seismic source and seismic source arrays. The seismic source may emit energy at a low frequency range. The seismic source arrays may emit energy at a high frequency range. The seismic source arrays may also be distributed in a crossline direction based on the high frequency range.

Described herein are implementations of various technologies for a method. The method may tow a marine survey spread that may include streamers, a low frequency seismic source and high frequency seismic source arrays. The low frequency seismic source may emit energy at a low frequency range. The high frequency seismic source arrays may emit energy at a high frequency range. The high frequency seismic source arrays may be distributed in a crossline direction based on the high frequency range. The method may shoot the high frequency seismic source arrays and the low frequency seismic source.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of various implementations described herein. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various implementations described herein are directed to methods and systems for acquiring seismic data. These implementations will be described in more detail with reference to FIGS. 1-5.

Figure 1:
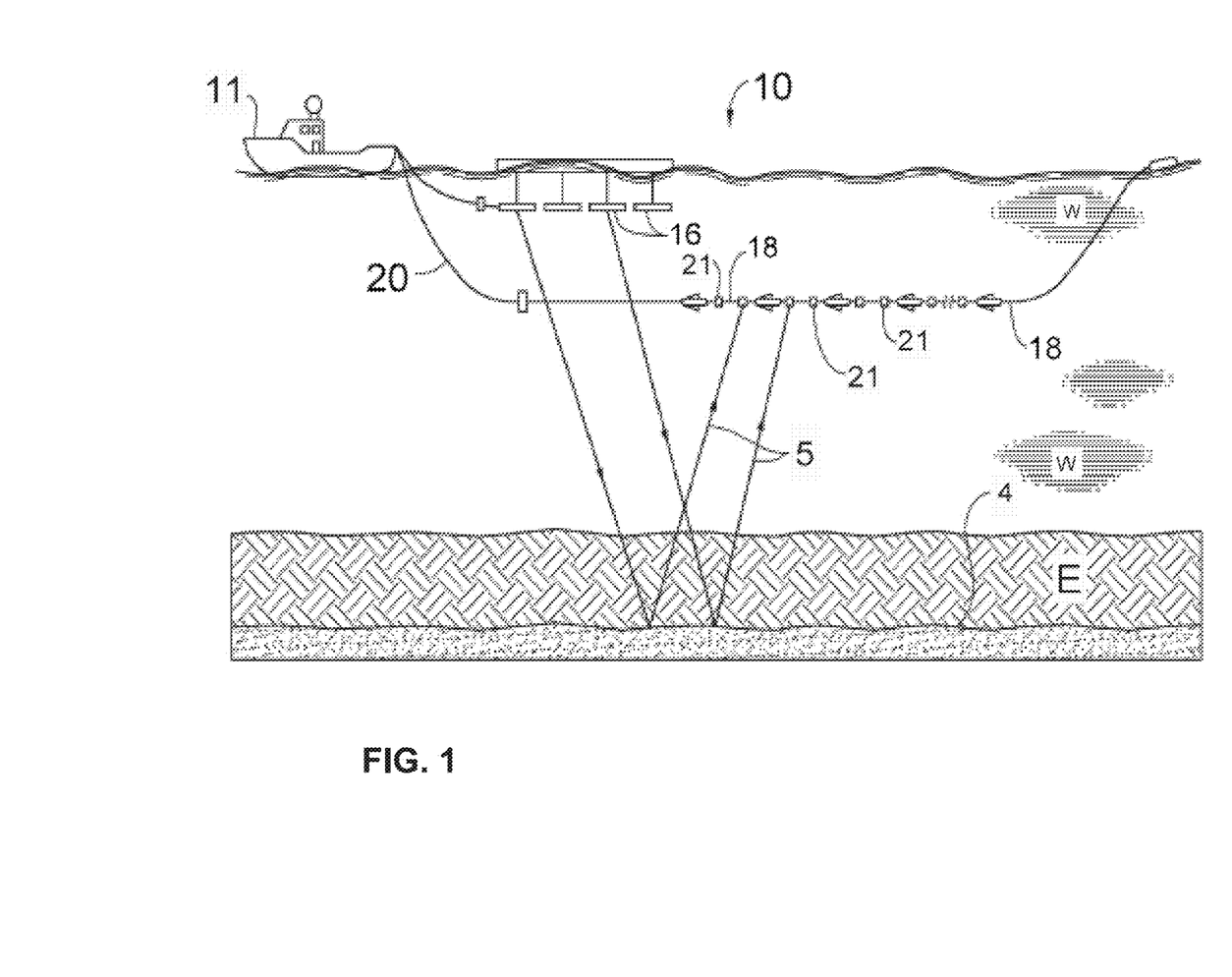
FIG. 1 illustrates a diagrammatic view of marine seismic surveying in accordance with various implementations described herein.

FIG. 1 illustrates a diagrammatic view of marine seismic surveying 10 in connection with implementations of various techniques described herein. A marine seismic acquisition system 10 may include a vessel 11 carrying control components and towing a plurality of seismic sources 16 and a plurality of streamers 18 equipped with seismic receivers 21. The seismic sources 16 may include a single type of source, or different types. The sources may use any type of seismic generator, such as air guns, water guns, steam injection sources, marine vibrators, explosive sources such as dynamite or gas injection followed by detonation and the like. The streamers 18 may be towed by means of their respective lead-ins 20, which may be made from high strength steel or fiber-reinforced cables that convey electrical power, control, and data signals between the vessel 11 and the streamers 18. An individual streamer may include a plurality of seismic receivers 21 that may be distributed at spaced intervals along the streamer's length. The seismic receivers 21 may include hydrophone sensors as well as multi-component sensor devices, such as accelerometers. Further, the streamers 18 may include a plurality of inline streamer steering devices (SSDs), also known as "birds." The SSDs may be distributed at appropriate intervals along the streamers 18 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 16 and the seismic streamers 18 may be deployed from the vessel 11 and towed slowly to traverse a region of interest. The seismic sources 16 may be periodically activated to emit seismic energy in the form of an acoustic or pressure wave through the water. The sources 16 may be activated individually or substantially simultaneously with other sources. The acoustic wave may result in one or more wavefields that travel coherently into the earth E underlying the water W. As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system in the vessel 11 via the streamers 18 and lead-ins 20. Through analysis of these detected signals, it may be possible to determine the shape, position and lithology of the sub-sea formations, including those formations that may include hydrocarbon deposits.

Figure 2:
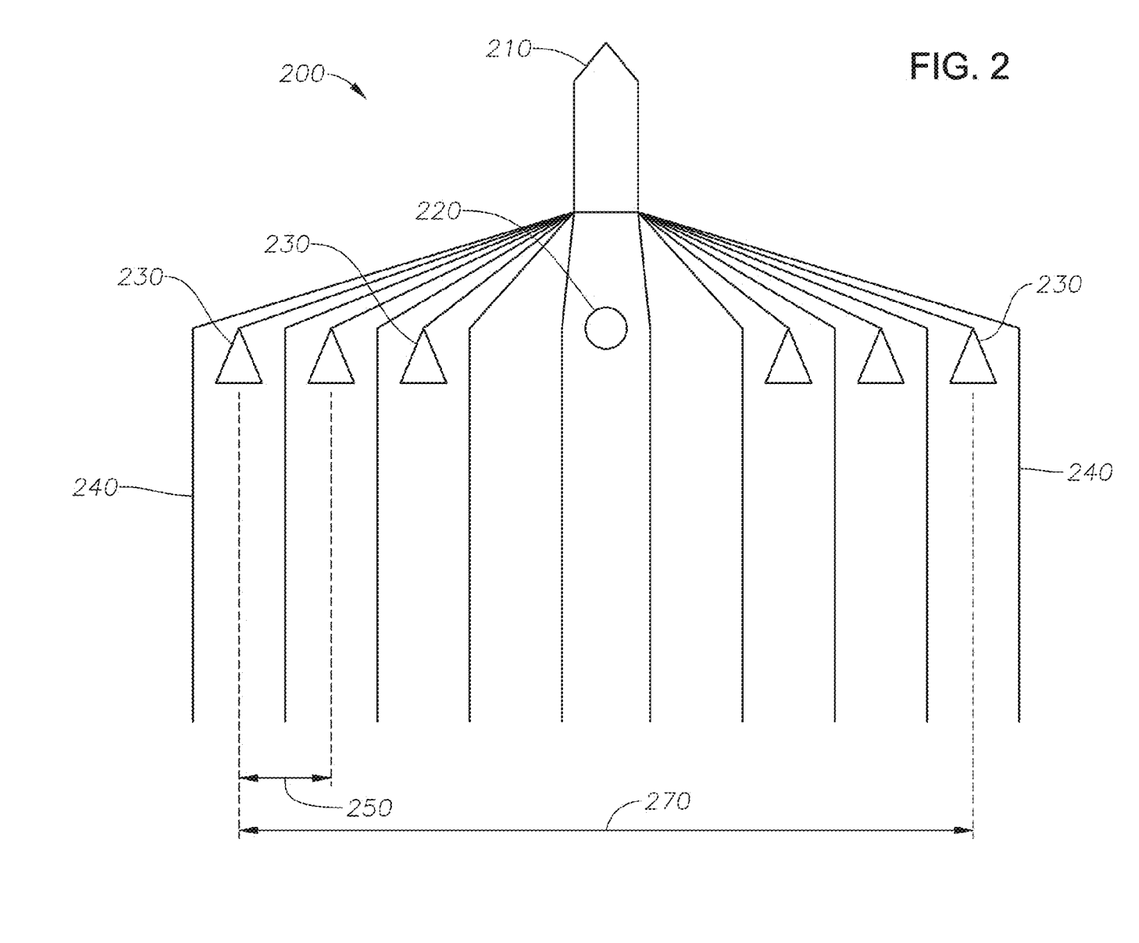
FIG. 2 illustrates a marine seismic survey acquisition system in accordance with various implementations described herein.

FIG. 2 illustrates a marine seismic survey acquisition system 200 using towed source arrays in accordance with various implementations described herein. The acquisition system 200 includes a vessel 210 towing a marine survey spread having a streamer array 240, a low frequency (LF) seismic source array 220 and high frequency (HF) seismic source arrays 230. A seismic source array may be a single source or a source group, where a source group may be treated as a single point source for analyzing seismic data. In one implementation, the marine seismic survey acquisition system 200 may include two or more LF seismic source arrays.

During a seismic acquisition over a particular survey area, the acquisition system 200 may acquire a low frequency survey using shots fired by the LF seismic source array 220 and a high frequency survey over the same survey area using the HF seismic source arrays 230. Data from the LF seismic source array 220 and the HF seismic source arrays 230 may be separated in data processing using simultaneous source techniques as those described below. High frequency seismic data may provide many possible applications, such as high resolution shallow data for near surface characterization or velocity model building. In one implementation, the low frequency range may be between about 0 Hz and about 20 Hz. In another implementation, the high frequency range may include emitted source frequencies above 20 Hz. In another implementation, the HF seismic source arrays 230 may have an upper frequency limit, which may be approximately 200 Hz.

The HF seismic source arrays 230 may be marine vibrators or impulsive source arrays. A marine vibrator, e.g., vibroseis, may be configured to operate at a predetermined frequency range, where the marine vibrator performs a seismic sweep from one frequency to another frequency (e.g., a sweep from 20 Hz to 80 Hz). The marine vibrators may be electrically or hydraulically driven. An impulsive source array may include several airguns at different depths, i.e., the airguns at a particular depth may provide seismic energy at a different frequency from the airguns in the impulsive source array at another depth. An impulsive source array may achieve a specific frequency range by using this implementation.

Keeping with FIG. 2, the acquisition system 200 may include a predetermined distribution 270 of the HF seismic source arrays 230 in the marine survey spread. For instance, the predetermined distribution 270 in a crossline direction of the acquisition system 200 may be based on the frequency range emitted by the HF seismic source arrays 230. Further, the predetermined distribution 270 may include a crossline source spacing 250 (the "crossline source spacing" may also be called the source line interval), where the crossline source spacing 250 may describe the distance or interval between the HF seismic source arrays 230. The predetermined distribution 270 may place the HF seismic source arrays 230 in either the crossline direction and/or the inline direction of acquisition system 200. As such, the predetermined distribution 270 may determine the crossline shot sampling for a seismic survey by determining the location of shot points (i.e., the location where sources are fired during a survey acquisition). In general, the crossline shot sampling describes the density of seismic shots in the crossline direction of the seismic spread. The crossline shot sampling may equal the crossline source spacing 250 or depend on the number of passes across a survey area (e.g., a seismic survey with a single pass and a crossline source spacing of 50 m may have a crossline shot sampling of 50 m, while a seismic survey that has two interleaved passes over a survey area with a crossline source spacing of 50 m may have a crossline shot sampling of 25 m). The crossline source spacing 250 may be periodic for the HF seismic source arrays 230, or the separation between the HF seismic source arrays 230 may be irregular.

Further, spatial aliasing on the source side may occur as the wavelengths of emitted seismic energy become shorter. If, for instance, the crossline shot sampling is less than the Nyquist frequency of the energy emitted by a seismic source, aliasing on the source-side may be present in acquired seismic data. The crossline source spacing 250 may be configured to prevent such aliasing by selecting distances between the HF seismic source arrays 230 that achieve a crossline shot sampling above the Nyquist frequency.

In one implementation, the predetermined distribution 270 may have the HF seismic source arrays 230 be offset at a distance in the crossline direction from the LF seismic source array 220 in order to prevent data aliasing in acquired seismic data. In another implementation, the crossline source spacing 250 may be configured to achieve a crossline shot sampling greater than the Nyquist frequencies for the high frequency range used by the HF seismic source arrays 230.

Figure 3A:
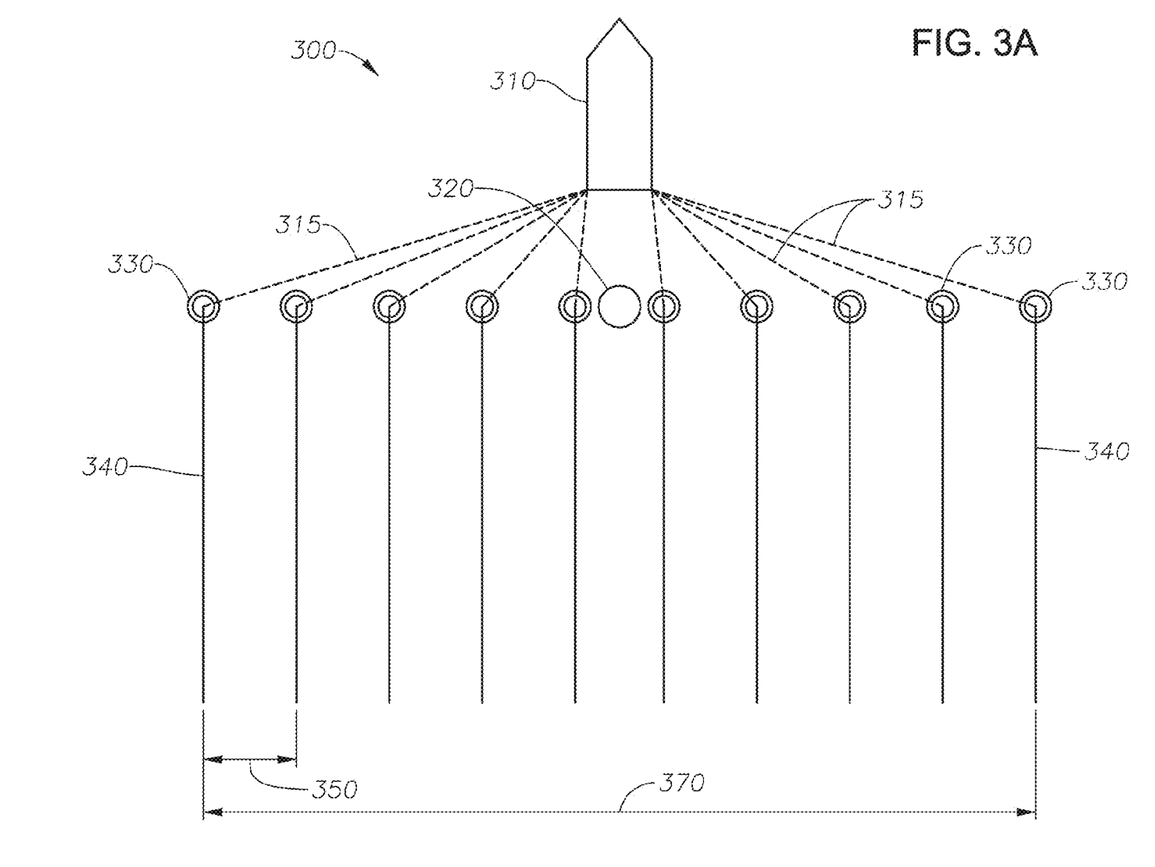
FIG. 3A illustrates a marine seismic survey acquisition system in accordance with various implementations described herein.

FIG. 3A illustrates a marine seismic survey acquisition system 300 using towed source arrays in accordance with various implementations described herein. The acquisition system 300 includes a vessel 310 towing a marine survey spread having a streamer array 340, a towed source array 320, marine vibrator arrays 330, and lead-in cables 315 coupled to respective streamers in the streamer array 340 and the marine vibrator arrays 330. The lead-in cables 315 may be configured to provide electrical power to the marine vibrator arrays 330. In one implementation, the marine vibrator arrays 330 may be coupled to the lead-in cables 315. In another implementation, the marine vibrator arrays 330 may be coupled to a secondary cable that branched off from the main portion of the lead-in cables 315.

Figure 3B:
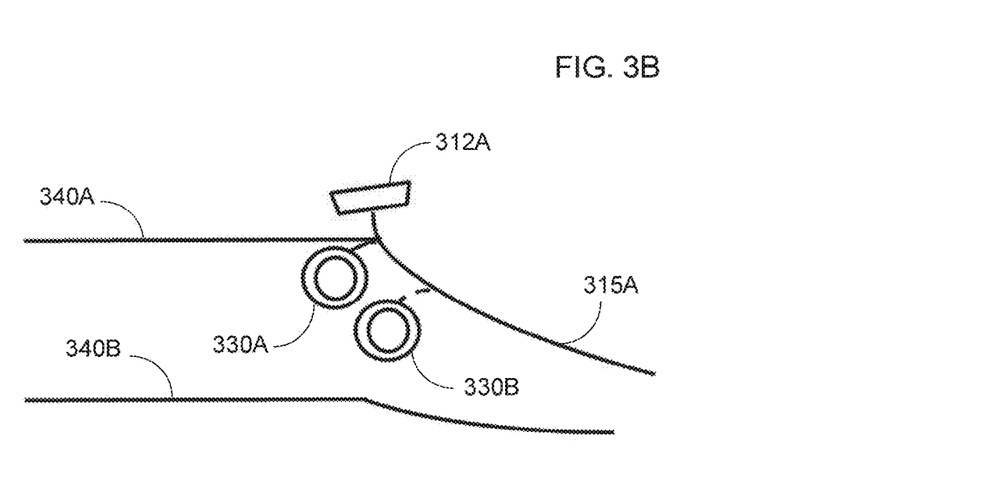
FIG. 3B illustrates a marine seismic survey acquisition system in accordance with various implementations described herein.

FIG. 3B provides an illustration of a portion of a marine survey acquisition system having a seismic streamer 340A, a seismic streamer 340B, and a marine vibrator array 330A being coupled to a lead-in cable 315A. The lead-in cable 315A is configured for powering the marine vibrator array 330A and the seismic streamer 340A. A positioning device 312A (e.g., a deflector or a bird) may be used to position the seismic streamer 340A. A marine vibrator array 330B shows another implementation where the marine vibrator array 330B may be coupled to a different point of the lead-in cable 315A.

Returning to FIG. 3A, the lead-in cables 315 may provide data transmission and power for streamers in the streamer array 340 as well as the marine vibrator arrays 330. The lead-in cables 315 may include an amount of copper in the cables sufficient to transfer enough electrical power from the vessel 310 for operating a streamer and a marine vibrator array. While the streamer array 340 may be neutrally buoyant, the lead-in cables 315 may not be. As such, the marine vibrator arrays 330 may be positioned proximate the front of respective streamers in the streamer array 340 to avoid a long secondary cable from the lead-in cables 315 or the addition of a heavy cable inside a streamer. In one implementation, a marine vibrator may be placed between a respective streamer and a power supply for the respective streamer coming from the vessel 310. For further information on where marine vibrator arrays may be positioned, see FIG. 5 below.

Further, the marine vibrator arrays 330 may be operated at a high frequency range, while the towed source array 320 may be operated at a low frequency range. The towed source array 320 may be an airgun array or another marine vibrator. In another implementation, the acquisition system 300 may have marine vibrator arrays, but without the towed source array 320.

The acquisition system 300 may include a predetermined distribution 370 of the marine vibrator arrays 330 with a crossline source spacing 350 between the marine vibrator arrays 330. With the marine vibrator arrays 330 being coupled to respective streamers, the crossline source spacing 350 may be the distance, also called the streamer interval or the receiver line interval, between seismic streamers in the streamer array 340. In one implementation, the crossline source spacing 350 may be configured similar to the crossline source spacing 250 described in FIG. 2.

Further, the higher the emitted source frequency, the less water displacement may be used to achieve a similar amplitude of the seismic wave. Consequently, the marine vibrator arrays 330 may operate at a higher frequency range than the towed source array 320, while using less energy to achieve the same or approximately the same amplitude. In one implementation, the lowest frequency emitted by the marine vibrator arrays 330 may be a function of the amount of power supplied by a streamer to a coupled marine vibrator array. For instance, if the marine vibrator arrays 330 are configured to operate at a frequency range near 80 Hz, less electrical power may be used by the marine vibrator arrays 330. If the marine vibrator arrays 330 are configured to operate at a frequency range near 20 Hz, more electrical power may be used by the marine vibrator arrays 330.

In one implementation, the marine vibrator arrays 330 may be monotonic or limited to a narrow frequency band. As such, different sources among the marine vibrator arrays 330 may emit seismic energy at different monotonic frequencies. By operating at different monotonic frequencies, seismic data for missing frequencies may be reconstructed in post-processing. The marine vibrator arrays 330 may also be configured to operate proximate the resonance frequency. Having the marine vibrator arrays 330 operating near the sources' resonance frequency may increase their efficiency and allow the marine vibrator arrays 330 to produce more signal from the power provided to the marine vibrator arrays 330.

Figure 4:
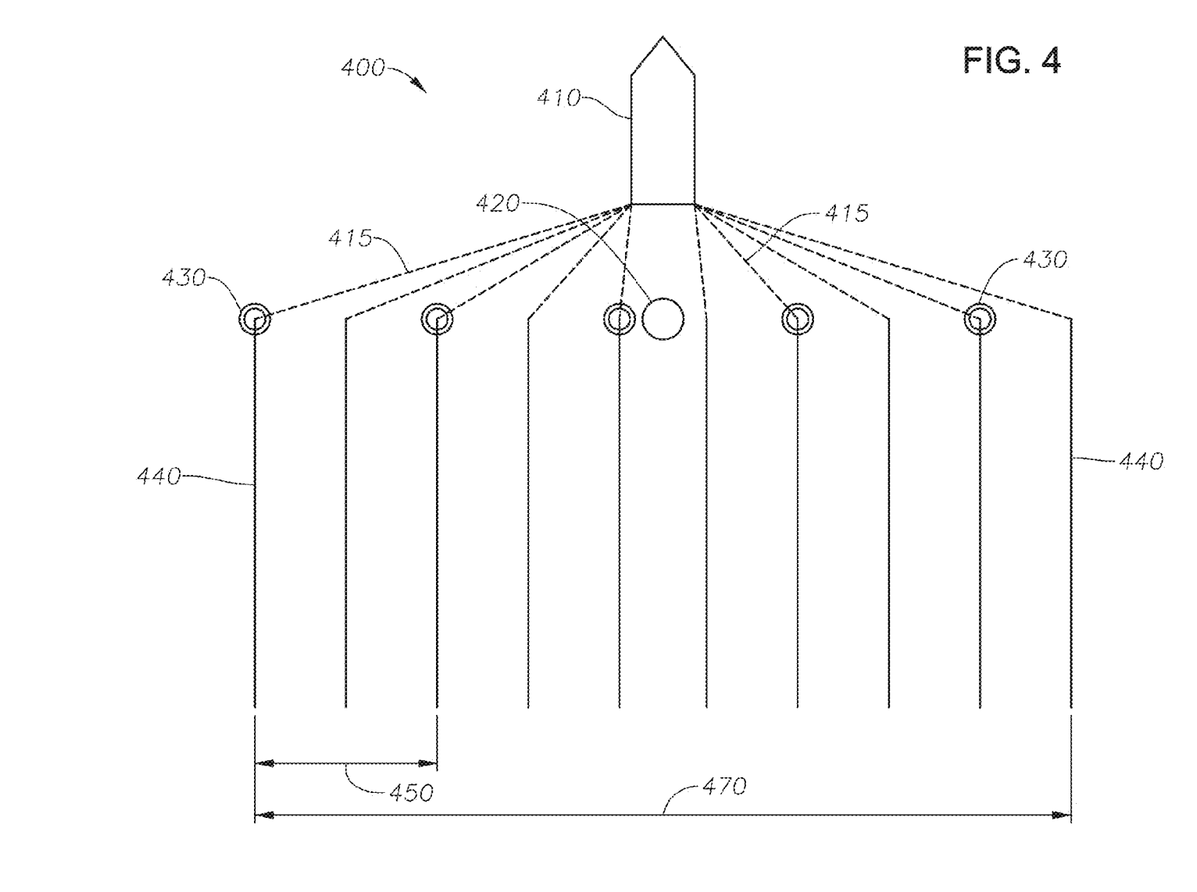
FIG. 4 illustrates a marine seismic survey acquisition system in accordance with various implementations described herein.

FIG. 4 illustrates a marine seismic survey acquisition system 400 using towed source arrays in accordance with various implementations described herein. The acquisition system 400 includes a vessel 410 towing a marine survey spread having a streamer array 440, marine vibrator arrays 430 coupled or electrically connected to lead-in cables 415 for respective streamers in the streamer array 440 and a towed source array 420. The marine vibrator arrays 430 may be positioned at respective streamers in the streamer array 440 to achieve a predetermined distribution 470 of the marine vibrator arrays 430. The predetermined distribution 470 may include a crossline source spacing 450 similar to the crossline source spacings 250 or 350.

In FIG. 4, the marine vibrator arrays 430 are positioned proximate respective streamers in an interleaved manner. For instance, a lead-in cable for a respective streamer may be coupled to a marine vibrator, while the lead-in cable for the next streamer in the streamer array 440 may not be coupled to a marine vibrator. While FIG. 4 describes an implementation that alternates between streamers with a coupled marine vibrator array, in other implementations, the streamer array 440 may have various arrangements of lead-in cables having or lacking coupled marine vibrators.

In one implementation, depending on the frequency range emitted by the marine vibrator arrays 430, the marine vibrator arrays 430 may be positioned on various streamers in the streamer array 440 with a crossline source spacing 450 to prevent aliasing in acquired seismic data.

Figure 5:
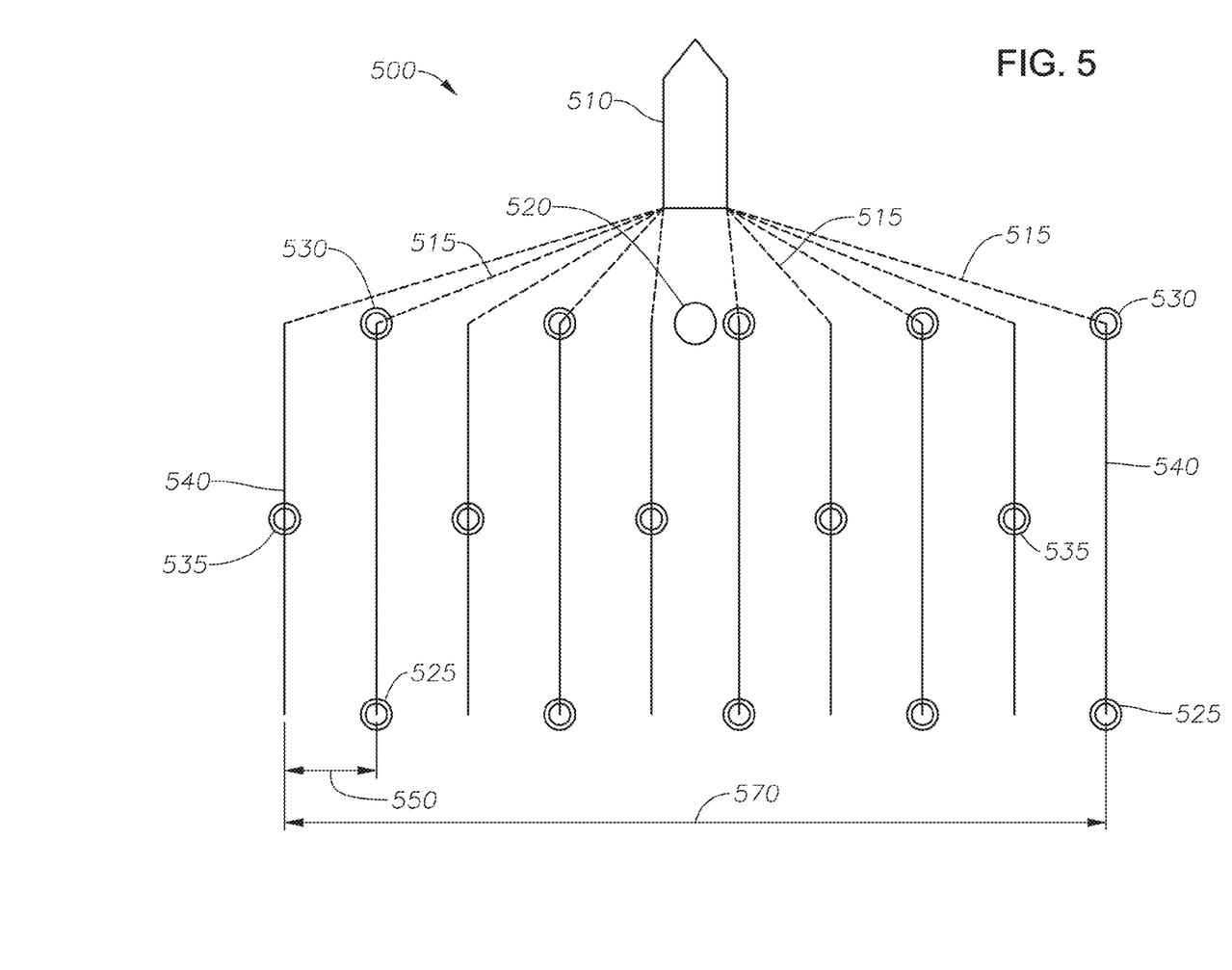
FIG. 5 illustrates a marine seismic survey acquisition system in accordance with various implementations described herein.

FIG. 5 illustrates a marine seismic survey acquisition system 500 using towed source arrays in accordance with various implementations described herein. The acquisition system 500 includes a vessel 510 towing a marine survey spread having a streamer array 540, front marine vibrator arrays 530, middle marine vibrator arrays 535, tail marine vibrator arrays 525, and a towed source array 520. The front marine vibrator arrays 530 are coupled to lead-in cables 515 proximate to the front of respective streamers in the streamer array 540 as described in FIG. 3A. The middle marine vibrator arrays 535 and the tail marine vibrator arrays 525 may be powered by a cable protruding from a respective streamer in the streamer array 540. The middle marine vibrator arrays 535 are positioned at points proximate to the middle of the respective streamers. While the middle marine vibrator arrays 535 are shown to be about the middle section of the streamer array 540, in other implementations, the middle marine vibrator arrays 535 may be coupled to other points along the respective streamer besides the middle section, such as closer or further away from the front of the streamer. The tail marine vibrator arrays 525 are coupled to points proximate to the tail-end of the respective streamers in the streamer array 540. The front marine vibrator arrays 530, the middle marine vibrator arrays 535 and the tail marine vibrator arrays 525 may form a predetermined distribution 570 for the marine vibrator arrays with a crossline source spacing 550. The crossline source spacing 550 may be selected similar to the crossline source spacings described in FIGS. 2 and 4.

In another implementation, the crossline source spacing 550 may be smaller than the spacing of streamers in the streamer array 540. For instance, two or more seismic sources may be branched from one of the lead-in cables 515. In another case, two or more seismic source may be branched from one of the streamers. Further, one seismic source may be branched out from a streamer, while another seismic source may be branched from the lead-in cable going to that streamer. As such, various implementations may be used to make the crossline source spacing 550 irregular.

Source arrays may be shot using simultaneous source separation techniques. Simultaneous source separation techniques may allow sources to be shot at the same time or substantially the same time, while allowing recorded seismic data for one source to be separated from recorded seismic data for other sources during data processing. For instance, the emitted wavefields from one source array may be encoded in such a manner as to enable recorded seismic data for that source to be decoded in post-processing. Where multiple encoded source arrays are shot at substantially the same time, seismic data associated with individual sources may be decoded and separated from the rest of the data associated with other sources.

One example of a simultaneous source separation technique may include having a particular source array being shot according to a substantially constant time interval, while a different source array may be shot according to a dither time referenced to the time interval of the particular source array. The constant time interval may correspond to the inline shot interval used for source sampling during a seismic survey. This separation technique may allow separating of any sources in a domain where seismic traces correspond to different source locations, such as the common receiver or common offset domain. One source array may be coherent within that domain, while any other sources may have a random time distribution.

Another simultaneous source separation technique may include using sources with a controllable phase, such as a marine vibrator. In this technique, individual sources may be encoded based on the phase shift between them. One criterion for the determination of the phase shift used for separating the individual sources may be that the shortest emitted wavelength is sampled at approximately ⅓ of the wavelength's length.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is limited to the specific features or acts described above. Rather, the specific features and acts described above are disclosed as example forms of implementing the claims.

What is claimed is:

1. A marine survey acquisition system, comprising:
   at least one vessel for towing a marine survey spread comprising:
      a plurality of streamers;
      a plurality of marine vibrators;
      a cable coupled to a respective streamer in the plurality of streamers and at least one of the marine vibrators, wherein the cable is configured for powering the respective streamer and the at least one of the marine vibrators, and wherein the at least one of the marine vibrators is configured to emit energy at a high frequency range; and
      wherein the marine survey spread further comprises a crossline source spacing for the marine vibrators, and wherein the crossline source spacing is configured to achieve a crossline shot sampling in a seismic survey greater than the Nyquist frequency for the high frequency range.

2. The marine survey acquisition system of claim 1, wherein the cable is a lead-in cable.

3. The marine survey acquisition system of claim 1, wherein the high frequency range is above 20 Hz.

4. The marine survey acquisition system of claim 1, wherein the marine survey spread further comprises a seismic source configured to emit energy at a low frequency range.

5. The marine survey acquisition system of claim 4, wherein the low frequency range is between about 0 Hz and about 20 Hz.

6. The marine survey acquisition system of claim 1, wherein the marine vibrators are positioned proximate the front ends of the respective streamers.

7. The marine survey acquisition system of claim 1, wherein the at least one of the marine vibrators is between the respective streamer and a power supply for the respective streamer.

8. The marine survey acquisition system of claim 1, wherein the marine vibrators comprise monotonic sources configured to operate at a resonance frequency of the monotonic sources.

9. A marine survey acquisition system, comprising:
   at least one vessel for towing a marine survey spread comprising:
      at least one streamer having at least one receiver;
      a seismic source configured to emit energy at a low frequency range; and
      a plurality of seismic source arrays configured to emit energy at a high frequency range, and wherein the seismic source arrays are distributed in a crossline direction based on the high frequency range.

10. The marine survey acquisition system of claim 9, wherein the seismic source arrays are disposed in the marine survey spread at an offset in the crossline direction from the seismic source.

11. The marine survey acquisition system of claim 9, wherein the marine survey spread further comprises a crossline source spacing for the seismic source arrays, wherein the crossline source spacing is configured to prevent data aliasing in acquired seismic data that corresponds to the high frequency range.

12. The marine survey acquisition system of claim 9, wherein the marine survey spread further comprises a crossline source spacing of the seismic source arrays, wherein the crossline source spacing is configured to achieve a crossline shot sampling greater than the Nyquist frequency for the high frequency range.

13. The marine survey acquisition system of claim 9, wherein the seismic source arrays are air gun arrays or marine vibrators.

14. The marine survey acquisition system of claim 9, wherein the low frequency range is between about 0 Hz and about 20 Hz.

15. The marine survey acquisition system of claim 9, wherein the high frequency range is above 20 Hz.

16. The marine survey acquisition system of claim 9, wherein at least one of the seismic source arrays comprises two or more seismic sources configured to emit energy at different frequencies at different depths.

17. A method, comprising:
   towing a marine survey spread comprising:
      a plurality of streamers;
      a low frequency seismic source configured to emit energy at a low frequency range; and
      a plurality of high frequency seismic source arrays configured to emit energy at a high frequency range, and wherein the plurality of seismic source arrays are distributed in a crossline direction based on the high frequency range; and shooting the high frequency seismic source arrays and the low frequency seismic source.

18. The method of claim 17, wherein the marine survey spread further comprises a crossline source spacing for the seismic source arrays, wherein the crossline source spacing is configured to achieve a crossline shot sampling greater than the Nyquist frequency for the high frequency range.

19. The method of claim 17, wherein the seismic source arrays are marine vibrators, wherein the marine survey spread further comprises a cable coupled to a respective streamer in the plurality of streamers and at least one of the marine vibrators, and wherein the cable powers the respective streamer and the at least one of the marine vibrators.

* * * * *